Patented Oct. 2, 1951

2,569,530

UNITED STATES PATENT OFFICE 2,569,530

TIME-CONTROLLED TEMPERATURE-RESPONSIVE FUEL CONTROL SYSTEM

Irving Kramer, Far Rockaway, and Joseph Rowe, Arverne, N. Y., assignors of one-third to said Rowe, one-third to Harry Sinoff, Brookline, and one-third to Ezekiel Wolf, Boston, Mass.

Application October 31, 1947, Serial No. 783,342

1 Claim. (Cl. 236—46)

The present invention relates to a system for controlling the heating of buildings, in which the outside temperature as well as the inside temperature enters into the control and initiation of a heating program for efficiently and economically heating the buildings, such as residences, apartment houses, office buildings, stores, and factories, for the greatest benefit and convenience of the users.

Time programs have in the past been used, in which the time for initiation of the program of heating for the day is established in advance or pre-set by some clockwork arrangement. The present invention includes in its system the use of a pre-set program which initiates, however, only the time at which the program begins, but does not control the kind of program or the variations which may occur in the program during the course of the day and night. In accordance with the invention in the present system, the program variations and changes are controlled by the outside temperature and, if desired, the dissipation of the heat within the building which, of course, varies with many things, such as whether the windows and doors are opened or closed frequently, whether the building cools quickly, the direction and strength of the wind, sheltering from other buildings, and many other factors, some of which are known and others, unknown.

The present invention will be more fully described in connection with the embodiment set forth in the specification annexed hereto, when taken in connection with the drawings illustrating the same, in which Fig. 1 shows schematically the system, illustrating in diagrammatic form the elements thereof and the electrical wiring connected therewith;

Figure 1:
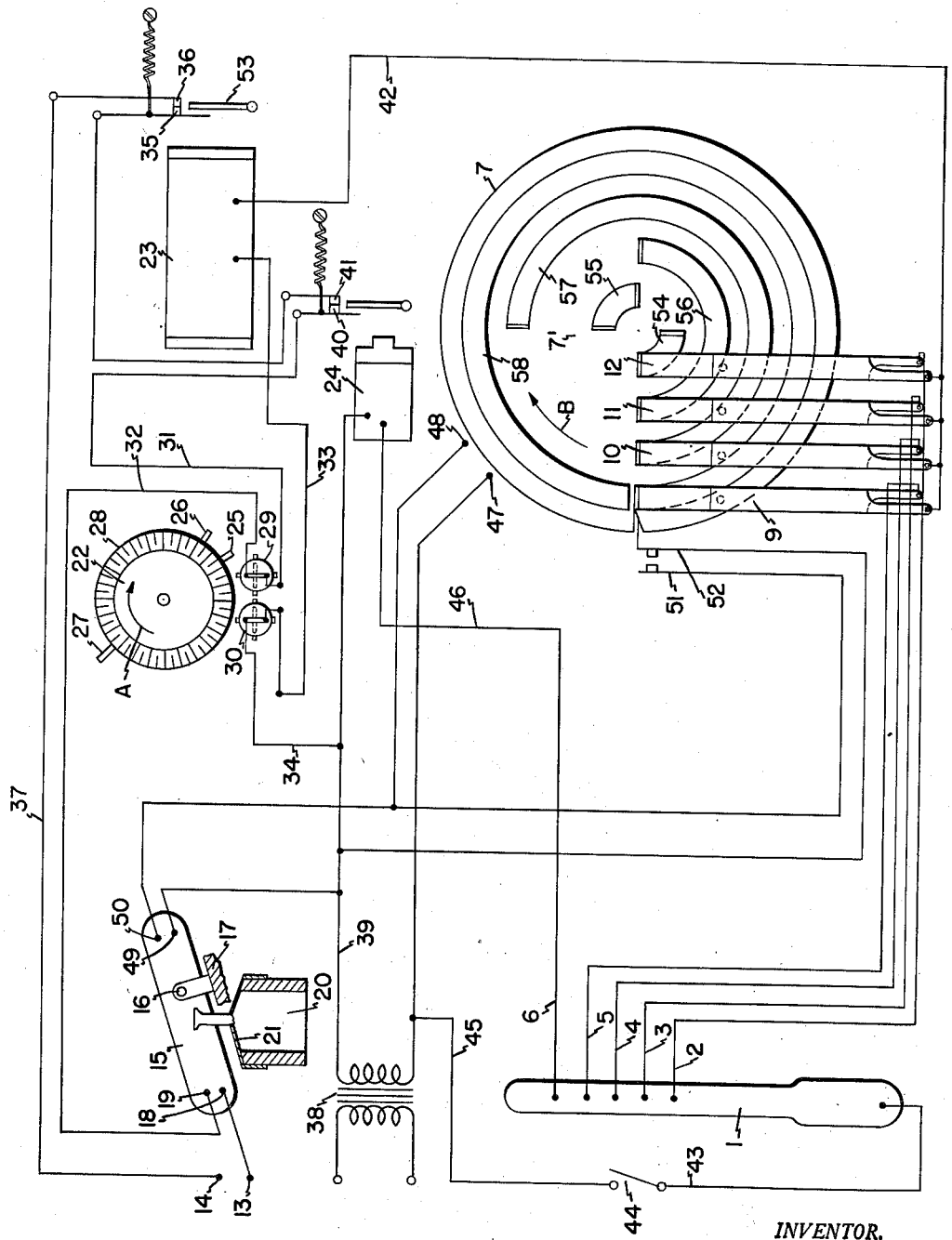
Figures 2, 3:
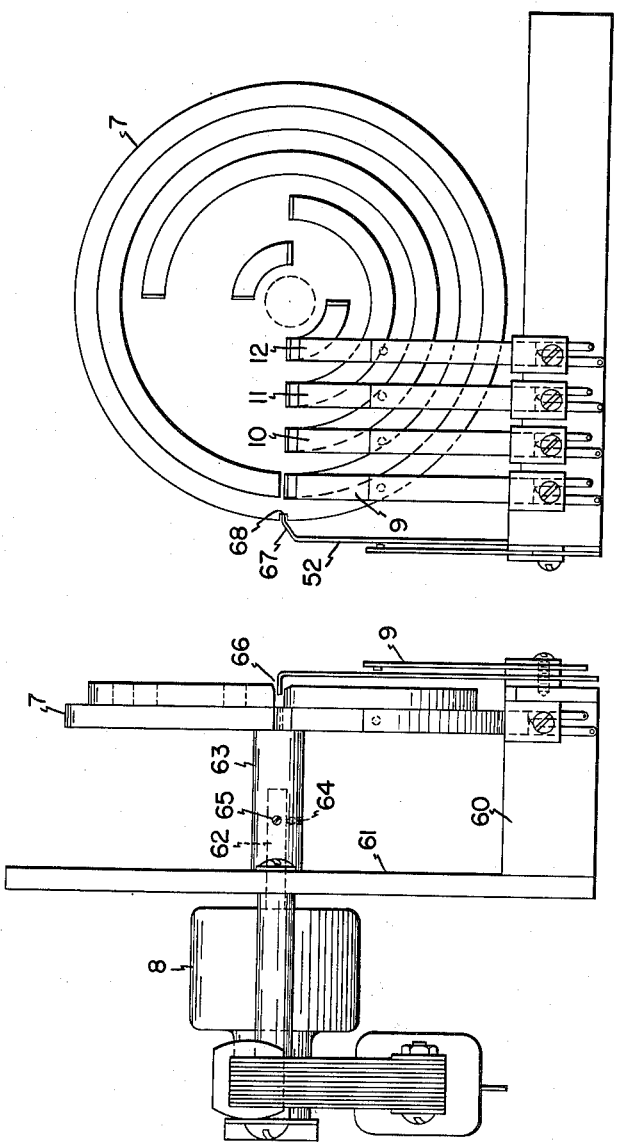
Fig. 2 shows a front elevation of a detail of Fig. 1.
Fig. 3 shows a side elevation of the device shown in Fig. 2.

In the arrangement indicated in Fig. 1, 1 represents a thermostat switch which might be a mercury thermometer tube with switch contacts 2, 3, 4, 5, and 6, located at points of selected temperatures, for instance at 5° or 10° intervals from some desired point. This thermostat switch is placed out of doors and therefore provides the outside temperature controlling element. The program device 7' is preferably located within the building and is provided with a disc 7 which is rotated by means of a time clock 8 (Fig. 3) such as a "Telechron clock" or any other suitable clock mechanism. The program device 7' controls the timed operation of a group of contacts 9, 10, 11, and 12 which tie in to the operation of the oil burner circuit which is connected across the terminals 13 and 14 (Fig. 1).

In the illustration of Fig. 1, there is included a mercury switch 15 which is pivoted by means of the pivot 16 to a fixed base 17. In normal operation of the system, when the steam or vapour pressure of the heating device or whatever means for heating may be used is below the cut-off position, the mercury switch is in the position shown in Fig. 1. When the heat or steam pressure, or whatever heating fluid or control is used, rises above its chosen limiting value, the mercury switch 15 is momentarily tilted from the position indicated in Fig. 1 to such an extent that the contacts 18 and 19 are disconnected by the conducting mercury in the tube 15 and momentarily the contacts 49 and 50 are made. This may be accomplished by steam pressure in the tube 20, causing the cap 21 to rise, tilting the mercury tube in a clockwise direction.

In addition to the elements already described, the system includes a time switch 22, a relay 23, and a relay 24. The time dial switch 28 is provided with two pins, 25 and 26, and a broad pin or bar 27, all of which are set into the edge of the dial 28 at desired points. The pin 25 is positioned to operate the switch 29, and the pin 26, to operate the switch 30, which latter pin may be offset on a different line so that each pin operates only its own switch, while the bar 27 is broad enough to operate both switch 29 and 30. The switches 29 and 30 may be of the rotary type in which one-fourth a turn turns the switch off. Under these conditions, the switch 29 will be turned on by the pin 25, and the switch 30, by the pin 26. Approximately twelve hours later, or according to the chosen setting of the pins and bar, the bar 27 will turn off successively the switch 29 and then the switch 30. The switch 29 is in series in the lines 31 and 32, and the switch 30 is in series in the lines 33 and 34. It will be seen on tracing the various circuits that the switch 29 and the contacts 35 and 36 of the relay 23 are in series with the burner connections 13 and 14 and the mercury switch contacts 18 and 19. Tracing this circuit, the connections are shown as follows: From the contact 14 of the burner connection at line 37, contacts 36 and 35 of the relay 23 which is normally de-energized, contacts 40 and 41 of relay 24 which is normally de-energized, line 31, switch 29, line 32, to the mercury contacts 19 and 18 and back to the burner connection 13. The relay 23 is controlled through the program switch mechanism 7 and also through the switch 30 when this is closed by the contact 26. The time switch rotates in the direction of the arrow A so that the contact 29 is closed before the contact 30. It will be seen that this expedient holds off the time of action of the relay 23 so that the contacts 35 and 36 are connected for a set initial period before the rest of the system may operate. When the pin 26 closes the switch 30, the circuit to the relay 23 is completed as far as the time switch is concerned. This circuit may be traced from the secondary of the transformer 38 over the line 39, the line 34, switch 30, the line 33, through the relay 23, the line 42, to one of the switches 9, 10, 11, or 12, thence to one of the contacts 2, 3, 4, or 5 of the thermostat 1 and through the thermostat 1 over the line 43, switch 44, line 45, to the other end of the secondary of the transformer 38.

The relay 24 is energized from the secondary of the transformer 38 in a circuit including the line 39, the relay 24, the line 46 of the contact 6 of the thermostat 1. The return circuit is completed through the thermostat and the elements 43, 44, and 45. The relay 24 operates to break the burner circuit if that is completed, when contacts 40 and 41 are opened.

The only other circuit which has not been mentioned is that which controls the operation of the motor 8. The terminals for this motor are indicated by 47 and 48 (Fig. 1). One side of this line is supplied directly from the transformer 38, viz: the terminal 47, while the terminal 48 is connected to the other side of the supply line of the transformer through contacts 49 and 50 in the mercury tube 15. These contacts 49 and 50 are shunted by the pair of contacts 51 and 52 controlled by the program switching device 7.

When the mercury switch is tilted from the position shown in Fig. 1 by an excess of heat, then the mercury running down to the right end of the tube 15 bridges across the contacts 49 and 50, thus starting the motor 8 in operation which thereupon causes a clockwise rotation of the program plate or switch mechanism 7, as indicated by the arrow B. It will be noted that this rotation of the plate or disk 7' will close not only contacts 51 and 52, but also the contacts of the switches 9, 10, 11, and 12, and closing of the contacts 51 and 52 operates as a holding circuit for the motor, since when the mercury tube 15 drops back to the position in Fig. 1, which occurs quite soon after its upward tilt, the circuit remains completed through the motor and the plate 7 continues to rotate. The completion of the contacts 9, 10, 11, and 12 serves to energize the line 42 through the thermostat switch 1, provided the temperature has risen to any of the points equal to or above the point 2 in the thermostat switch. Assume that the weather is such that the mercury in the thermostat stands between the points 2 and 3, then the line in connection with the contact 2 would be energized, which means that current would flow through the switch 12, the line 42, the relay 23, the line 33, the switch 30 (which is assumed closed), the line 34, and the line 39 to the transformer 38. Relay 23 would therefore operate to attract the armature 53 and open connections between the contacts 35 and 36. This, it will be seen, breaks the circuit with the heating device to the terminals 13 and 14 even if the switch 15 is in the position indicated in Fig. 1. The result of this operation is that immediately after the mercury switch drops back to the position as shown in Fig. 1, after the heat has forced it up, the burner will remain off during the time in which the relay 23 is energized. If the program control device is operating through the contact 12 and the raised bars 54 and 55, it will be seen that the burner circuit will remain open for one quarter cycle, come on through the second quarter of the cycle, remain off for the third quarter of the cycle when the bar 55 comes beneath the contact 12, and come on again during the last quarter of the cycle. If the temperature outside rises to the point 3, the switch 11 will control the operation of the relay and in this case the burner will remain off because of the bar 56 for a whole half cycle and then come on during the second half cycle. The arcuate bar 57 will keep the burner off for three quarters of the cycle, while the bar 58 will keep the burner off for the complete cycle. It will be noted, of course, that the higher the temperature, the longer the burner remains off. The relay 24, it will be seen, is energized in series with the contact 6 of the thermostat switch, which is the highest temperature point on the thermostat. When the outside temperature has reached this degree, then the relay 24 will operate, opening the circuit between the contacts 13 and 14 so that the burner will cease to operate. It is noted that the relay 24 does not go through the program device so that at any time when the temperature outside rises to a point where the contact 6 is closed, the system will automatically shut down.

The program device 7' (Figs. 2 and 3) comprises a base 60 with an upright supporting element 61, to which the clock motor 8 is attached. The driving shaft of the motor 8 extends through the bracket 61 as indicated by the dotted shaft 62, which fits into a recess in the shaft extension 63, which is locked to the shaft by means of set screws 64 and 65. The shaft extension 63 carries the insulating plate or disk 7 at the front part of which are located the arcuate cams 54, 55, 56, 57, and 58. In the positions indicated in Figs. 1 and 2, which is the beginning of a cycle, the turned in ends of the switch arms, as 66 and 67 for instance (Figs. 1 and 2) extend over the cam bars so that the contacts 9, 10, 11, and 12 are all open. The cam bar 58, it will be noted, is slotted radially at the position of the beginning of the cycle, so that the switch 9 may remain open at this point. The locking switch connections 51 and 52 for the motor 8 open by the arm 52 falling into a slot 68 in the disk 7. Preferably the arcuate cam bars are also made of insulating material so that all of the switch contacts are insulated one from the other.

In the complete operation of the system, the time switch 22, which makes one revolution per day, is so set that in the morning hours first the switch 29 is closed, thus completing the circuit to the fuel burner. Following this by perhaps two hours or less, according to the setting of the pins, the pin 26 will operate the switch 30 thus permitting the relay 23 to become operative through the program device 7', if that device has been set in operation through the action of the mercury switch 15 may be rotated or tilted before the switch 30 is closed, in which case the program device 7' will commence to rotate and function, but the relay 23 will not operate until the switch 30 has operated. As a practical matter, the operation of the switch 30 does not usually lag behind the operation of the switch 29 to such an extent but that it is closed before the mercury switch is operated by the excess of heat in the boiler.

The embodiment shown in the drawings presents only one group of control programs. Various combinations of arcuate bars may be used on the plate 7 of the program mechanism to split up the off and on time of the burner in the manner which may be desired. One of the chief advantages in the present system is that the program begins when a certain definite heating condition has been attained. In other words, when the heat in the building has risen to such a point that no further heat is necessary at the moment, the program then begins to function from the definite condition which has been established by the relative temperatures existing inside the building and outside. This is an ideal condition since the program of heating commences from a definitely established condition. It will be noted in the arrangement that no internal thermostat has been shown. Such a thermostat may be used, operative in the burner line, but the present system will, however, function by the proper arrangement of program cams when the known factors relative to any one building have been determined. The program may be selected in accordance with these factors, in which case an internal thermostat control may not be necessary.

Having now described our invention, we claim:

A system for the control of heating of buildings or the like, comprising an outside temperature device, a cyclic heating program switch having different programs, operatively selective by said temperature device, a switch operable by heating device of the building when the heating device has reached a heating limit for initiating the operation of the program device and at the same time shutting off the heating device, and means operative by the program switch for interrupting and commencing the heating according to the program selected by the temperature device, and switching means operable directly by said temperature device for shutting off the heating device, said last switching means having contacts in series with those of the switch for shutting off the heating device when said heating limit has been reached.

IRVING KRAMER.
JOSEPH ROWE.

REFERENCES CITED

The following references are of record in the file of this patent:

UNITED STATES PATENTS

| Number | Name | Date |
|---|---|---|
| 860,339 | Slifka | July 16, 1907 |
| 1,604,342 | Greenhut | Oct. 26, 1926 |
| 2,275,427 | Greenlee | Mar. 10, 1942 |
| 2,323,411 | Newman | July 6, 1943 |
| 2,326,002 | Baak | Aug. 3, 1943 |
| 2,346,259 | Hutchings | Apr. 11, 1944 |
| 2,466,914 | Sampsel | Apr. 12, 1949 |